United States Patent
Horachi (10) Patent No.: US 7,151,750 B2
(45) Date of Patent: Dec. 19, 2006

(54) ISDN ALARM NOTIFICATION SYSTEM

(75) Inventor: Kazunori Horachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 722 days.

(21) Appl. No.: 10/004,006

(22) Filed: Nov. 28, 2001

(65) Prior Publication Data

US 2002/0041569 A1  Apr. 11, 2002

Related U.S. Application Data

(63) Continuation of application No. PCT/JP99/04688, filed on Aug. 30, 1999.

(51) Int. Cl.
G06F 11/00 (2006.01)
H04L 12/16 (2006.01)
H04J 1/00 (2006.01)

(52) U.S. Cl. .................. 370/244; 370/250; 370/264; 370/485; 379/47

(58) Field of Classification Search ........... 370/242, 370/244, 246, 248, 250, 264, 485; 379/88.12, 379/47; 709/203
See application file for complete search history.

(56) References Cited

U.S. PATENT DOCUMENTS

| | | | | |
|---|---|---|---|---|
| 4,731,782 A | * | 3/1988 | Shimizu et al. | 370/354 |
| 5,305,315 A | | 4/1994 | Lee | |
| 5,436,895 A | * | 7/1995 | Matsumoto | 370/391 |
| 5,621,731 A | * | 4/1997 | Dale et al. | 370/257 |
| 5,867,481 A | * | 2/1999 | Miyagi | 370/244 |
| 6,002,665 A | * | 12/1999 | Choe | 370/217 |
| 6,035,029 A | * | 3/2000 | Little et al. | 379/219 |
| 6,078,649 A | * | 6/2000 | Small et al. | 379/39 |

FOREIGN PATENT DOCUMENTS

| | | |
|---|---|---|
| JP | 04-186937 | 7/1992 |
| JP | 05-336561 | 12/1993 |
| JP | 05-336583 | 12/1993 |
| JP | 06-070043 | 3/1994 |
| JP | 06-121062 | 4/1994 |
| JP | 09-214602 | 8/1997 |
| JP | 10-234060 | 9/1998 |
| JP | 11-055357 | 2/1999 |

OTHER PUBLICATIONS

International Search Report dated Dec. 7, 1999.

* cited by examiner

Primary Examiner—Afsar Qureshi
(74) Attorney, Agent, or Firm—Katten Muchin Rosenman LLP (57) ABSTRACT

An ISDN alarm notification (fault locating) system in subscriber transmission equipment is connected to switching equipment conforming to TR-303 standard, in particular. The system includes a controller for setting switch options in subscriber transmission equipment externally, in addition to a digital switch and subscriber transmission equipment. The subscriber transmission equipment is provided with a switching equipment interface unit, a control path unit, and an ISDN subscriber interface unit. The controller sets the switch options provided in the switching equipment interface unit, the control path unit, and the ISDN subscriber interface unit. Thereby each switch option performs identical function, corresponding to each digital switch connected to the subscriber transmission equipment. Thus an ISDN alarm can be notified accurately to any TR-303 digital switch even network terminals NT1 of different types are connected to ISDN subscribers, and the compatibility with conventional services (TR-008 POTS/ISDN, TR-303 POTS/ISD N) is maintained.

10 Claims, 8 Drawing Sheets

PRIOR ART

FIG. 1

PRIOR ART

FIG. 2

DLC NETWORK CONFIGURATION

TABLE 1

| ITEM | CONDITION | m-bit AND eoc TO BE SENT TO THE SWITCH |
|---|---|---|
| 1 | CH CARD UNLOADED | m-bit(NT OH) = '0111 1110 111'b, <br> eoc : addr. = 1, msg = "78" |
| 2 | POINT U LOSS OF SYNCHRONIZATION | m-bit(NT OH) = '0111 1110 111'b, <br> eoc : addr. = 2, msg = "78" |
| 3 | NT1 POWER OFF | m-bit(NT OH) = '0111 1110 111'b, <br> eoc : addr. = 2, msg = "78" |
| 4 | POINT T LOSS OF SYNCHRONIZATION | m-bit(NT OH) = '0111 1101 111'b, <br> eoc : addr. = 7, msg = "FF" |

Table 2

| Item | Condition | SWOPT = 1 (LUCENT, SIEMENS) | SWOPT = 2 (NORTEL) | SWOPT = 3 (No corresponding vender) (default setting) |
|---|---|---|---|---|
| 1 | CH card unloaded | 1. "M_EVENT_REPORT" for ISDN Line To send Termination" LT OH = '1111 1111 1111 111' b NT OH = '0000 0000 0000 000' b | 1. To send "M_EVENT_REPORT for ISDN Line Termination" 2.To send "M_EVENT_REPORT for ISDN Framed Path Termination Change of Overhead Bits Report" LT OH = '1111 1111 1111 111' b NT OH = '0001 1101 1101 111' b | 1. To send "M_EVENT_REPORT for ISDN Line Termination" LT OH = '1111 1111 1111 111' b NT OH = '1111 1111 1111 111' b (The same setting as in the older version software) |
| 2 | Point U loss of synchronization | 1. To send "Alarm Status Change Report" LT OH = '0111 1111 1111 111' b NT OH = '0000 0000 0000 000' b | 1. To send "Alarm Status Change Report" 2. To send "NT1 Overhead Change Report" LT OH = '0111 1111 1111 111' b NT OH = '000x x101 111' b (x : The same value as before occurrence of loss of synchronization at point U) | 1. To send "Alarm Status Change Report" LT OH = '1111 1111 1111 111' b NT OH = the value received from NT1 (The same setting as in the older version software) |
| 3 | NT1 power off | 1. To send "Alarm Status Change Report" LT OH = '0111 1111 1111 111' b NT OH = '0000 0000 0000 000' b | 1. To send "Alarm Status Change Report" 2. To send "NT1 Overhead Change Report" LT OH = '0111 1111 1111 111' b NT OH = '000x x101 111' b (x : : The same value as before occurrence of NT1 power off) | 1. To send "Alarm Status Change Report" LT OH = '1111 1111 1111 111' b NT OH = the value received from NT1 (The same setting as in the older version software) |

ISDN ALARM NOTIFICATION SYSTEM

This application is a continuation of international application number PCTJP99/04688, filed Aug. 30, 1999.

FIELD OF THE INVENTION

The present invention relates to an ISDN alarm notification system for fault locating in subscriber transmission equipment being connected to switching equipment, and more particularly an ISDN alarm notification system in subscriber transmission equipment being connected to switching equipment conforming to TR303 standard.

BACKGROUND OF THE INVENTION

Recently a digital loop carrier service is being introduced mainly in North America for subscribers being remotely located from switching equipment. The subscribers are connected to the switching equipment through multiplexed optical transmission lines.

Figure 1:
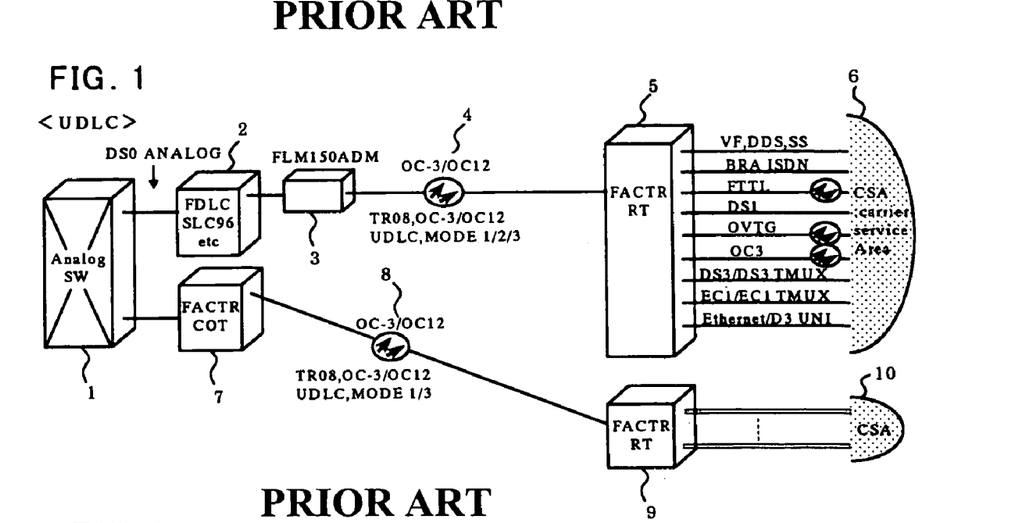
FIG. 1 shows a configuration example of the UDLC (Universal Digital Loop Carrier) system.

In FIG. 1, a configuration example of a UDLC (Universal Digital Loop Carrier) system is shown. A DS0 level analog output from an analog switch 1 is converted into a digital signal by means of digital loop carrier equipment 2, and is converted further to an optical multiplexed signal 4, such as OC3/OC12, by an add-drop multiplexer (ADM) 3. The signal is then forwarded to a remote terminal station 5 which accommodates a terminal located in a carrier service area 6.

Also, a DS0 analog output from analog switch 1 is converted into an optical multiplexed signal 8 through an access carrier transport system (ACTR) 7 having a dynamic cross connect function. The signal is then forwarded to a remote terminal station 9 which accommodates a terminal located in a carrier service area 10.

Figure 2:
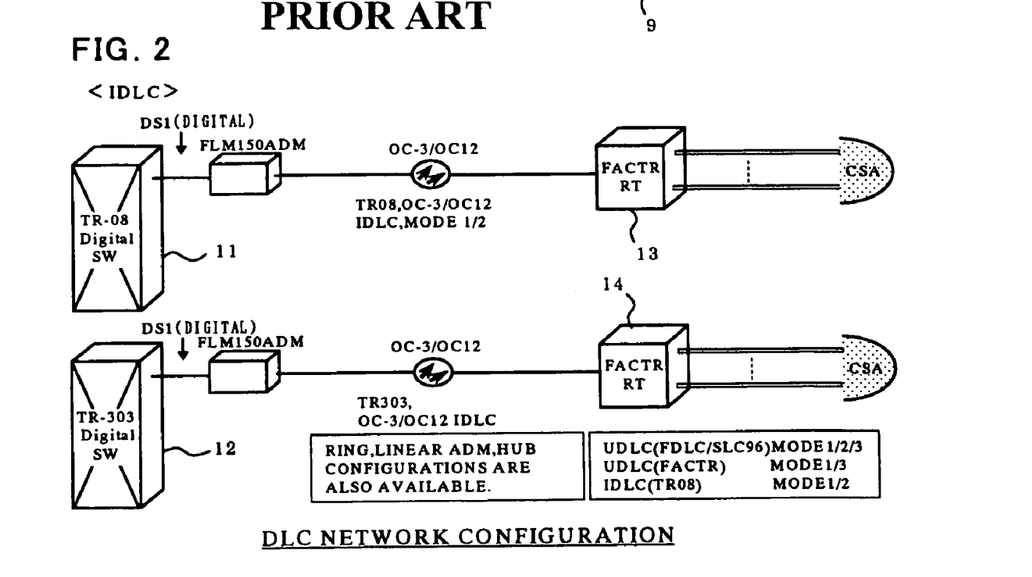
FIG. 2 shows a configuration example of the IDLC (Integrated Digital Loop Carrier) system.
Figure 3:
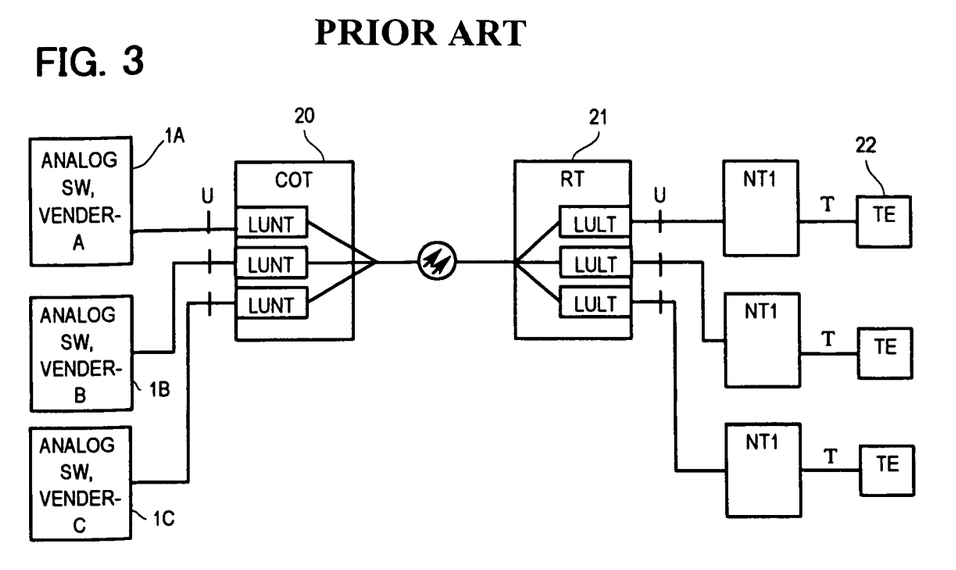
FIG. 3 shows an explanation drawing of the conventional technique conforming to the identical interface standard TR-008, irrespective of the switching equipment venders.

In FIG. 2, there are shown digital switches (TR008 compliant and TR303 compliant), which output DS1 signals. Digital switches 11, 12 are connected oppositely to remote terminal stations 13, 14 of access carrier transport systems (ACTR), constituting an Integrated Digital Loop Carrier (IDLC) system.

Here, a digital switch (TR008) 11 is one type of switching equipment which transmits/receives control signals through a service channel within each subscriber line. A digital switch (TR303) 12 is another type of switching equipment which uses a different path for control signal transmission through a dynamic cross connect.

The systems shown in FIGS. 1, 2 are described below in more detail. Conventional analog switches 1A–1C have the identical interface, irrespective of the switching equipment venders, conforming to the identical interface standard (TR-008). Regarding ISDN in particular, alarm notification and fault locating method is specified by TR-397 standard.

In addition, a central office terminal (COT) 20 and a remote terminal station (RT) (or, subscriber transmission equipment) 21 being located between switches 1A–1C and subscriber terminal equipment 22 constitute the UDLC structure shown in FIG. 1, which is so called 'invisible existence'.

Therefore, in designing both central office terminal (COT) 20 and remote terminal (RT) 21, it was not necessary to take switching equipment venders into consideration. Basically it is possible to transmit signals between switches 1A–1C and subscriber terminals 22 without modification (i.e. transparently).

More specifically, in TR-008 mode, it is possible to send a common m-bit and a control path message (eoc: embedded operation channel) using the identical specification without regard to the switching equipment venders in the event of an ISDN alarm condition.

Figure 4:
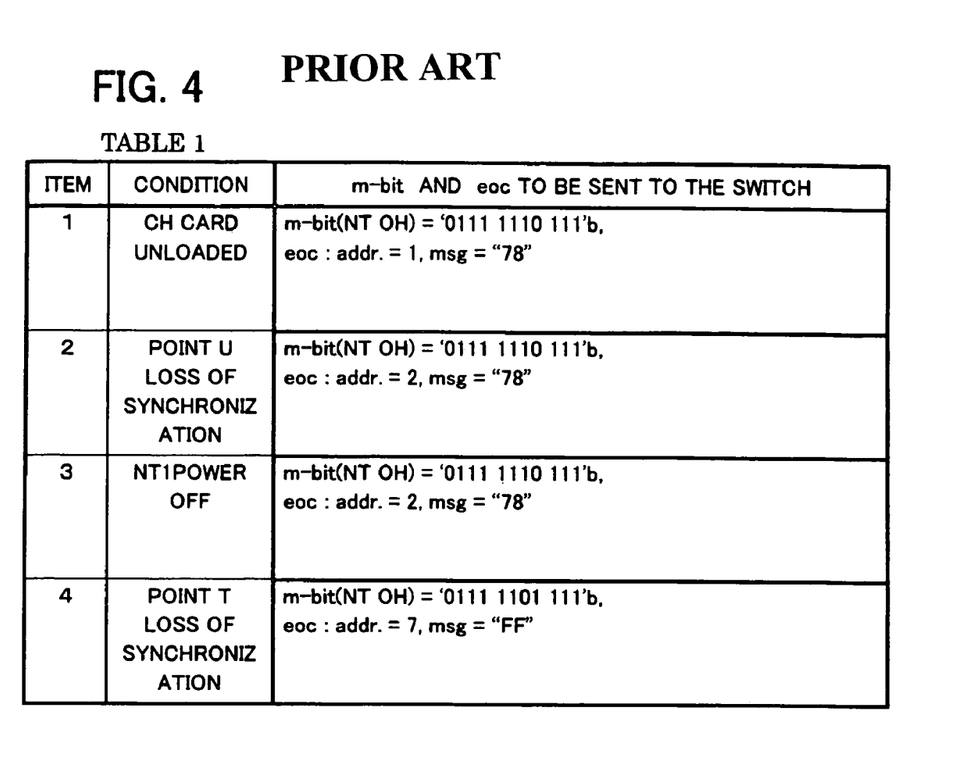
FIG. 4 shows examples of ISDN alarm notification commands and the values (TR-008) corresponding to respective switching equipment of different venders.

In table 1 shown in FIG. 4, there is illustrated ISDN alarm notification command and the values thereof (TR-008) applicable to every switching equipment vender. For example, in the case of CH card extraction listed in item 1, on detection of an interface LUNT in central office terminal (COT) 2 being not installed, m-bit='0111 1110 111'b is sent to switch 1.

Each bit is named (from left to right) as act, ps1, ps2, ntm, cso, m46, sai, nib, m51, m52 and m61. In the above case, act and nib are '0', while the others are '1'.

Also, in the case of item 1, eoc message having addr.=1 and msg='78' is sent to switch 1. Here, addr.=1 denotes LUNT (COT side), addr.=2 denotes LULT (RT side), and addr.=0 denotes NT1, respectively. According to the indication of msg='78' which denotes 'loss of synchronization', it is to be understood that an alarm condition occurs in interface LULT corresponding to addr.=2, causing an alarm sent from addr.=1 to switch 1.

Similarly, in the case of loss of synchronization at reference point U shown in item 2, m-bit is also sent as in the case of item 1, while eoc address is changed to '2'.

In the case of NT1 power off shown in item 3, m-bit and control path (eoc) are sent, similarly to item 2, because the state is moved to the loss of synchronization at point U which is the same as item 2.

In the case of loss of synchronization at reference point T shown in item 4, both act bit and sai bit are '0' and the remainder bits are '1'. Even the synchronization is lost at point T, the synchronization to network terminal NT1 is still in established condition. Therefore, control path (eoc) having '7', which denotes a broadcast address, and a message having 'FF', which denotes 'return to normal' are sent.

SUMMARY OF THE INVENTION

There exists a problem in subscriber transmission equipment conforming to TR-303 standard that alarm information of an ISDN subscriber is not correctly recognized by switching equipment manufactured by a certain vender (Nortel Networks).

In the IDLC configuration shown in FIG. 2 conforming to TR-303 standard, a signal between switching equipment and a subscriber cannot be transmitted transparently, unlike the case of UDLC configuration.

More specifically, subscriber alarm information is managed by the subscriber transmission equipment RDT, to be transmitted using a control path (eoc: embedded operation channel) between the switching equipment and the subscriber. According to an access carrier transport system (ACTR) being an object of the present invention, a 4:1 time-division multiplexing (TDM) mode function is already added aiming to connect a data terminal (IDT).

In 4:1 TDM mode, control information is transmitted and received using control path (eoc: embedded operation channel) between switching equipment conforming to TR-303 standard and subscriber transmission equipment (RDT). However, in TR-397 standard related to ISDN, the details of eoc (on alarm notification of ISDN subscribers) are not clearly specified for 4:1 TDM mode.

Therefore, practically each manufacturer designs switching equipment based on the manufacturer's own ISDN alarm detection specification to support TR-303 interface.

Considering the aforementioned situation, according to the present invention, switch options (SWOPT) are provided in an ISDN card for the access carrier transport system (ACTR), so as to make it possible to transmit and receive ISDN alarm notification corresponding to the respective switching equipment provided by different venders.

According to the present invention, a preferred embodiment of an ISDN alarm notification system includes digital switching equipment; subscriber transmission equipment connected to the switching equipment; and a controller for setting switch options externally, the subscriber transmission equipment including, a switching equipment interface unit, a control path unit, and an ISDN subscriber interface unit. Switch options provided in the switching equipment interface units, the control path unit and the ISDN subscriber interface unit are set from the controller, so that switch options are set the same, corresponding to the digital switching equipment connected to the subscriber transmission equipment.

Further, the switch options in the ISDN subscriber interface unit are alarm controllers corresponding to the digital switching equipment.

As another embodiment of the present invention, the ISDN alarm notification system includes a plurality of digital switching equipment; subscriber transmission equipment connected to the plurality of switching equipment; and a controller for setting switch options externally, the subscriber transmission equipment including, switching equipment interface units, a control path unit, and an ISDN subscriber interface unit. Switch options provided in the switching equipment interface units, the control path unit and the ISDN subscriber interface unit are set from the controller, so that switch options are set the same, corresponding to the plurality of digital switching equipment connected to the subscriber transmission equipment.

Preferably the switch options in the ISDN subscriber interface unit are alarm controllers corresponding to the digital switching equipment.

Still further, in the above-mentioned ISDN alarm notification system, the plurality of digital switching equipment provide interfaces conforming to RDT301-1 to -4 standards, and each switching equipment type corresponding to each RDT303 standard can be set into the switching equipment interface unit, control path unit, and ISDN subscriber interface unit in the subscriber transmission equipment.

Also, in the above-mentioned ISDN alarm notification system, the plurality of digital switching equipment are products of different venders.

Still further, as another embodiment of the present invention, an ISDN alarm notification system includes a plurality of digital switching equipment; and analog switching equipment having, subscriber transmission equipment connected to the plurality of digital switching equipment through digitizing equipment directly, and a controller for setting switch options externally. The subscriber transmission equipment includes, switching equipment interface units, a control path unit, and an ISDN subscriber interface unit, and switch options provided in the switching equipment interface units, the control path unit and the ISDN subscriber interface unit are set from the controller, so that switch options are set the same, corresponding to the plurality of digital switching equipment connected to the subscriber transmission equipment.

Still further, preferably, the ISDN subscriber interface unit includes alarm controllers of identical configuration corresponding to a plurality of channels to be connectable to a plurality of different switching equipment modes on a channel by channel basis.

Also, preferably the ISDN subscriber interface unit includes alarm controllers for at least two channels in one ISDN card.

Further, the ISDN subscriber interface unit includes a terminator, which detects an uninstalled condition of an ISDN channel card.

Still further, the ISDN subscriber interface unit includes a terminator, which detects a disconnected condition of a network terminal.

Still further, the ISDN subscriber interface unit includes a terminator, which detects a power off condition of a network terminal.

Further scopes and features of the present invention will become more apparent by the following description of the embodiments with the accompanied drawings.

BRIEF DESCRIPTION OF THE DRAWINGS

FIG. 9 shows an explanation drawing of ISDN alarm notification commands and the values (TR-303) corresponding to respective switching equipment of different venders.

PREFERRED EMBODIMENTS OF THE INVENTION

The preferred embodiments of the present invention are described hereinafter referring to the charts and drawings, wherein like numerals or symbols refer to like parts.

Figure 5:
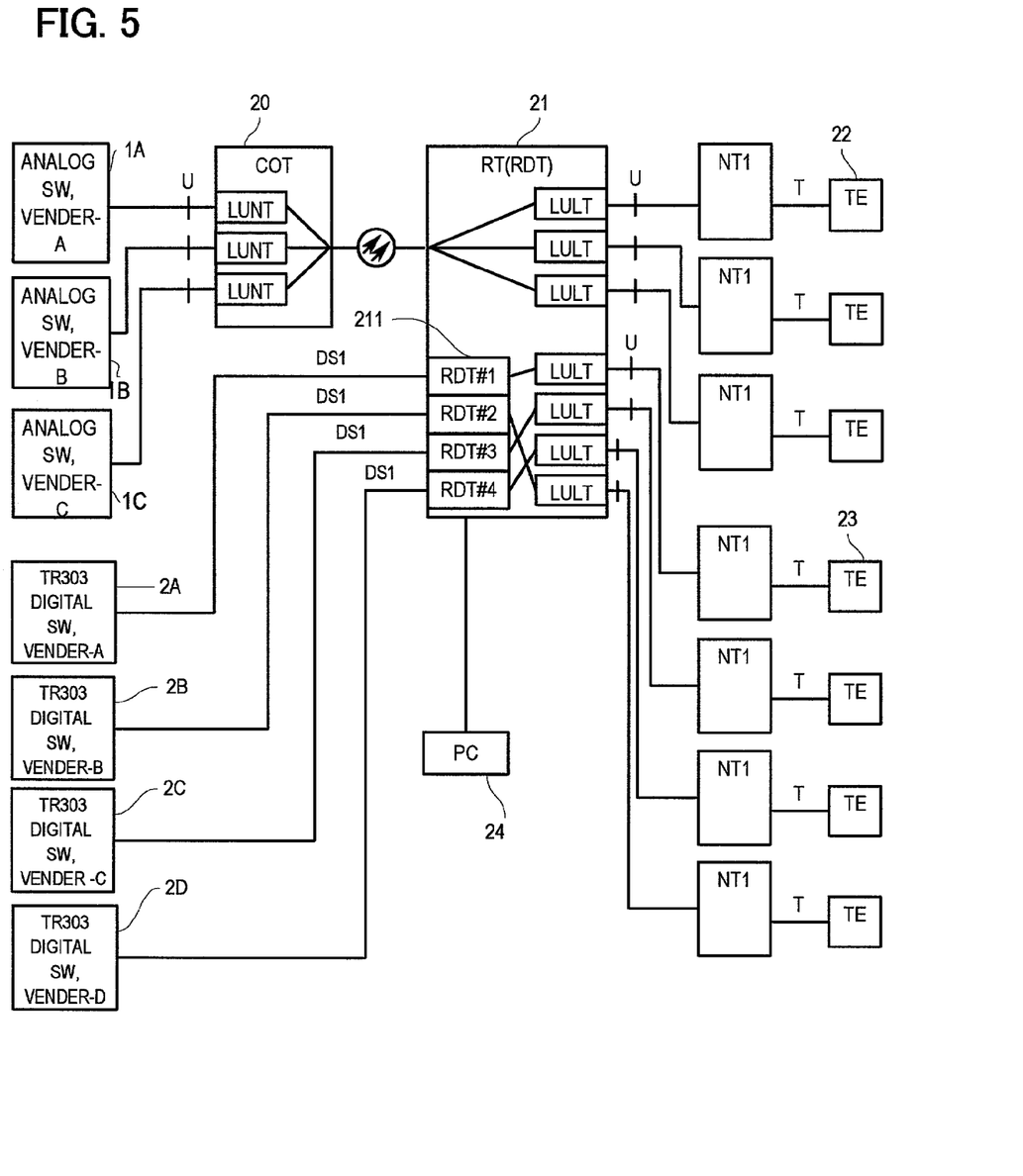
FIG. 5 shows an explanation drawing illustrating an outline of the present invention.

In FIG. 5, there is shown an embodiment of the present invention illustrating a conceptual configuration of the invention. As shown in FIG. 5, when connecting to digital switches 2A to 2D having TR-303 standard interfaces, a central office terminal (COT) 20 is not required. A remote digital terminal (RDT) 21 constituting subscriber transmission equipment is directly connected to the switches 2A to 2D via DS1 signals.

Here, the interface specification (ISDN alarm detection method) is differently defined in each digital switch 2A to 2D having TR-303 interface standard. Therefore, uniquely defined alarm information cannot be applied, and ISDN alarm notification scheme must be differently specified depending on each type of the switching equipment.

For this reason, according to the present invention, a switch option SWOPT is set from a computer (PC) 24 connected to subscriber transmission equipment (ACTR:

access carrier transport system) 21 so as to make it possible to transmit ISDN alarm notification corresponding to each switching equipment.

Figure 6:
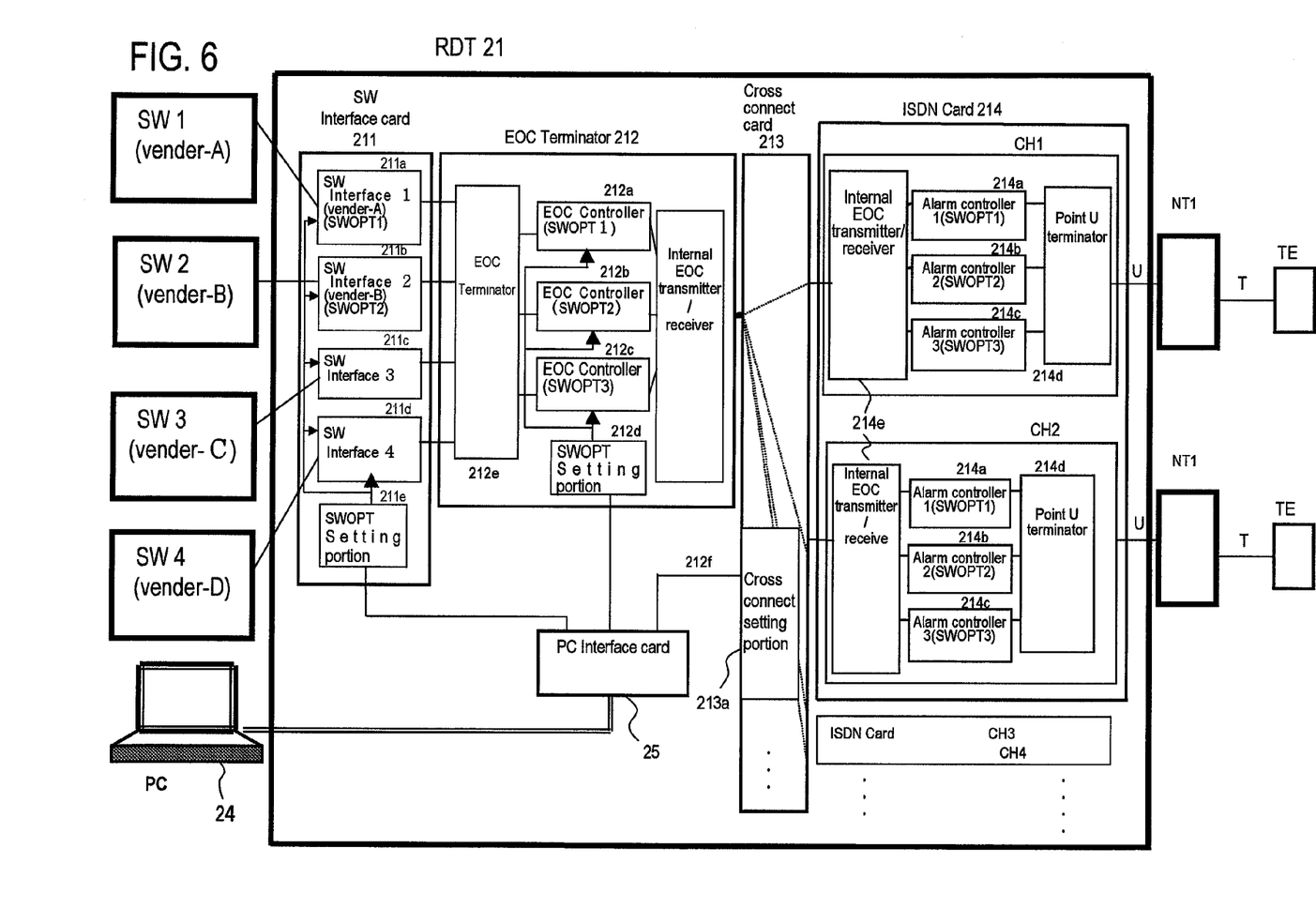
FIG. 6 shows a drawing illustrating a configuration example of subscriber transmission equipment according to the present invention.

In FIG. 6, there is shown a configuration example of subscriber transmission equipment and other equipment, illustrating the principle of the present invention. In FIG. 6, a TR-303 digital switch SW1 provided by one vender (vender -A) is connected to subscriber transmission equipment 21 through DS1. A switch (SW) interface card 211 in subscriber transmission equipment 21 is provided with SW interfaces 211a to 211d, and an SWOPT setting portion 211e for setting the switch options to SW interfaces 211a to 211d.

Switch options SWOPT1, 2 or 3 in each SW interface 211a to 211d can be set from SWOPT setting portion 211e. Here, regarding switch SW1 of vender -A being connected to the first SW interface 211a, vender -A is defined as SWOPT1 in subscriber transmission equipment 21. Accordingly, by controlling SWOPT setting portion 211e from computer (PC) 24 through a PC interface card 25, the first SW interface 211a is set into switch option SWOPT1.

Meanwhile, an EOC control card 212 includes EOC controllers 212a to 212c. Here, EOC controller 212a (SWOPT1) controls the control path (eoc: embedded operation channel) through an EOC terminator 212e from SW interface 211a in which SWOPT1 is set by SWOPT setting portion 212d.

Further, this first EOC controller 212a transmits and receives an internal EOC to/from an ISDN card 214 through an internal EOC transmitter/receiver 212f.

There is provided a cross connect card 213 between an EOC control card 212 and ISDN card 214 to perform cross connect function. An operation mode of cross connect is determined by setting information transmitted from computer (PC) 24 to cross connect setting portion 213a through PC interface card 25.

There are provided circuits for two channels in one ISDN card 214. Channel (CH) 1 and channel (CH) 2 in ISDN card 214 are shown in the figure. The circuit structure is identical between each channel, having a first alarm controller 214a, a second alarm controller 214b and a third alarm controller 214c to issue alarm notification to SWOPT1 to SWOPT3, respectively.

For example, a connection is established to cross connect setting portion 213a in cross connect card 213 by computer (PC) 24, so that CH1 is connected to switch SW1. After this connection is established, alarm controller 214a is set effective from EOC control card 212 so that CH1 in ISDN card 214 performs alarm control against SWOPT1.

Based on the above-mentioned structure, for example when ISDN card is removed (i.e. shifted to uninstalled state), EOC controller 212a and EOC controller 212b in EOC control card 212 respectively inform the first and second switches SW1, SW2 of alarm notification indicating the transitions of CH1 and CH2 to uninstalled state.

Also, when point U of CH1 is shifted to loss of synchronization condition, namely a point U terminator 214d is not connected to network terminal NT1, point U terminator 214d of CH1 detects the loss of synchronization at point U. Then alarm controller 214a transmits an alarm command conforming to SWOPT1 specification from an internal EOC transmitter/receiver 214e to the switching equipment.

Similarly, when point U of CH2 is shifted to loss of synchronization condition, point U terminator 214d of CH2 detects the loss of synchronization at point U. Then alarm controller 214b transmits an alarm command conforming to SWOPT2 specification from an internal EOC transmitter/receiver 214e to the switching equipment.

When point T of CH1 (located between network terminal NT1 and terminal equipment TE) is shifted to loss of synchronization condition, network terminal NT1 transmits the information of loss of synchronization at point T to alarm controller 214a of CH1 in ISDN card 214 through point U using m-bit. Alarm controller 214a then transmits control path eoc on the occurrence of loss of synchronization at point T according to an alarm notification method expected by the vender -A of the switching equipment.

Figure 7:
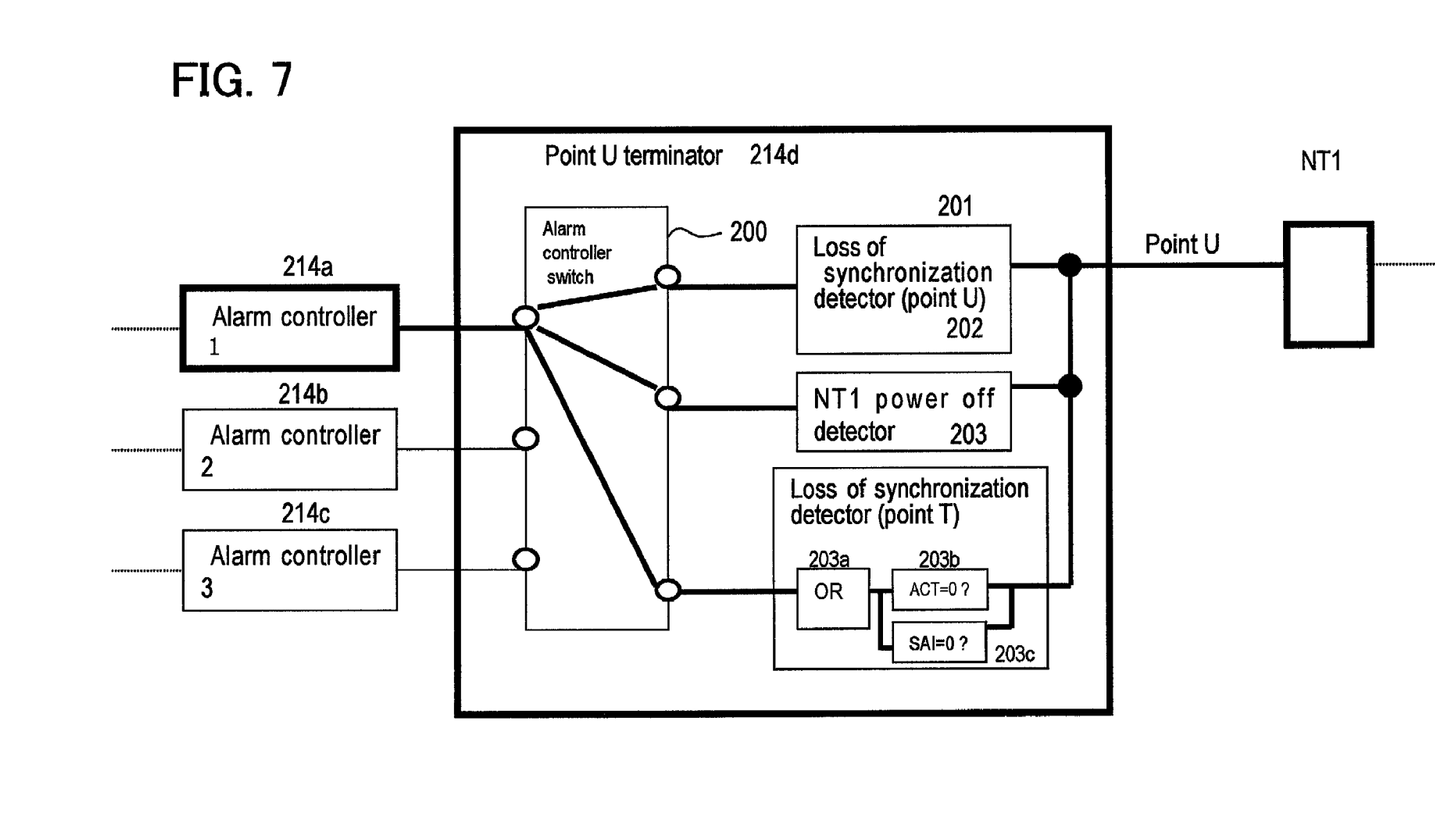
FIG. 7 shows a drawing illustrating a configuration example of a point U terminator shown in FIG. 6.

In FIG. 7, a detailed configuration example of point U terminator 214d is shown. Point U terminator 214d includes an alarm controller switch 200, a loss of synchronization detector (point U) 201, an NT1 power off detector 202, and a loss of synchronization detector (point T) 203.

It should be noted that the value of m-bit for notifying loss of synchronization at point T varies depending on the type of network terminal NT1. Namely, in one case the notification is carried out using either ACT=0. In other cases, the notification is carried out using SAI=0, or both act=0 and sai=0.

It is necessary to detect loss of synchronization condition at point T in any type of network terminal NT1. For this purpose, as shown in FIG. 7, in loss of synchronization detector (point T) 203 of point U terminator 214d, there are provided a circuit 203b for detecting ACT=0, and a circuit 203c for detecting SAI=0, and further an OR circuit 203a for making OR between the outputs of circuit 203b and circuit 203c.

Accordingly, the loss of synchronization at point T is detected by determining either act bit or sai bit becomes "o".

In addition, if this m-bit is transmitted directly to the switching equipment, the loss of synchronization at point T is not detected by the switching equipment. Therefore, a measure is taken that a control path alarm report is transmitted from alarm controller 214a after converting the m-bit value to the value of LT OH or NT OH expected by vender -A of switching equipment SW1.

Accordingly, the loss of synchronization at point T is accurately notified to any type of switching equipment if any type of network terminal NT1 is connected to ISDN card 214.

Figure 8:
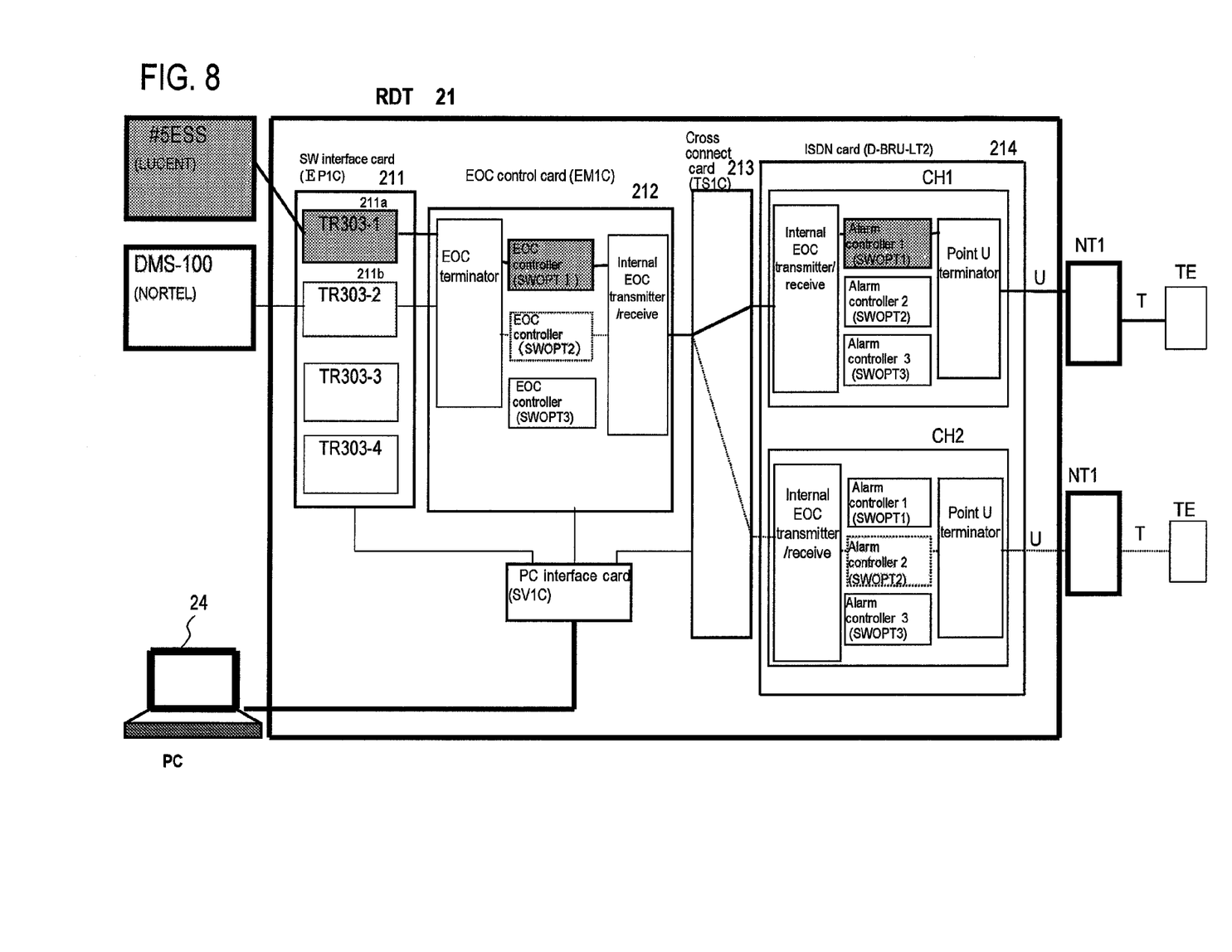
FIG. 8 shows a configuration drawing of an embodiment of subscriber transmission equipment according to the present invention.

In FIG. 8, an embodiment of the present invention is shown. In this figure, two types of switching equipment are connected as TR-303 digital switches: #5ESS (manufactured by Lucent Technologies) as first switching equipment SW1, and DMS-100 (manufactured by Nortel Networks) as second switching equipment SW2.

As switch options, RDT303-1:SWOPT=1 (for the Lucent switch) and RDT303-2:SWOPT=2 (for the Nortel switch) are set by computer (PC) 24.

Here, RDT303-1 and RDT303-2 are interfaces 211a and 211b provided in SW interface card 211 respectively to interface with the first and the second switching equipment. CH1 and CH2 in ISDN card (D-BRU-LT2) 214 is cross-connected to interface 211a (RDT303-1) and interface 211b (RDT303-2) using a cross connect card 213.

By this cross connect, the same switch option SWOPT as in RDT303-1 and RDT303-2 is set in CH1 and CH2 of ISDN card 214. Also, an EOC controller in EOC control card (EMIC) 212 operates based on the specification corresponding to switch option SWOPT.

Here, it is possible to identify maximum four types of switching equipment in one subscriber transmission equipment (RDT) 21. Independent types of switching equipment can be set in each of four interfaces: RDT303-1, RDT303-2, RDT303-3 and RDT303-4.

In FIG. 9, there is shown as table 2 a list of ISDN alarm notification commands and values in ISDN card (D-BRU-LT2) 214 corresponding to each vender of the switching equipment.

Among the venders, switch option SWOPT=1 is allocated for both Lucent Technologies and Siemens AG, and switch option SWOPT=2 is allocated for Nortel Networks, respectively to handle notification commands.

In regard to switch option SWOPT=3 is not used at present because there is no other supporting venders. However, the equipment is designed so as to operate by the software of previous version developed before the present invention. This backward compatibility enables to prevent an abnormal operation in the case the equipment having only EOC control card updated is used.

In the description shown in the table of FIG. 9, there are shown EOC information notification to be transmitted from subscriber transmission equipment (RDT) 21 to the switching equipment. Here, 'LT OH' and 'NT OH' respectively denote the m-bit on downward direction of point U (LT OH) and the m-bit on upward direction (NT OH).

In the table of FIG. 9, in the case of unloaded CH card listed in item 1, only "M_EVENT_REPORT for ISDN Line Termination" is transmitted when the switch option SWOPT=1 is set. However, when the switch option SWOPT=2 is set, it is required to transmit "M_EVENT_REPORT for ISDN Framed Path Termination Change of Overhead Bits Report", in addition to "M_EVENT_REPORT for ISDN Line Termination".

When transmitting the "M_EVENT_REPORT for ISDN Framed Path Termination Change of Overhead Bits Report", the information of LT OH and NT OH shown in table 2 is also included.

In the case of loss of synchronization at point U listed in item 2, the loss of synchronization having been detected in loss of synchronization detector (point U) 203 provided in point U terminator 214d is transmitted as an alarm to the switching equipment. In this case, only "Alarm Status Change Report" must be transmitted to the switching equipment when the switching equipment is manufactured by either Lucent Technologies or Siemens AG having the switch option SWOPT1.

Also, the act bit of LT OH is to be set to '0', and all bits of NT OH are to be set to '0'. Meanwhile, to the switching equipment manufactured by Nortel Networks having the switch option SWOPT2, "Alarm Status Change Report" and "NT1 Overhead Status Change Report" must be transmitted. Also the act bit of LT OH is to be set to '0', and the act, ps1, ps2 and sai bits of NT OH are to be set to '0'.

In the case of NT1 power off listed in item 3, the condition becomes the same as the condition of loss of synchronization at point U. Therefore the transmission message is the same.

In the case of loss of synchronization at point T listed in item 4, the loss of synchronization having been detected in the loss of synchronization detector at point T provided in point U terminator is transmitted as an alarm to the switching equipment. In this case, the switching equipment to which the switch option SWOPT1 is allocated detects the loss of synchronization at point T, if the act bit of LT OH is '1' and the act bit of NT OH is '0', while the switching equipment to which the switch option SWOPT2 is allocated detects the loss of synchronization at point T, if the act bit of LT OH is '1', and both the act bit and sai bit of NT OH are '0'.

Thus, by transmitting the values shown in table 2 of FIG. 9, the loss of synchronization at point T can be detected in the switching equipment.

INDUSTRIAL APPLICABILITY

As the embodiments having been described, according to the present invention, it is not necessary to substitute an equipment module or the like for connecting to a digital switch having TR303 standard. The connection can be conducted by simple modification of adding software function to be installed in an ISDN card.

When a network terminal NT1 of different type is connected to an ISDN subscriber, it is possible to transmit an ISDN alarm accurately to any TR-303 digital switch, while maintaining the conventional services (TR-008 POTS/ISDN, TR-303 POTS/ISDN). This contributes to accurate maintenance work of fault locating of subscriber lines.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. An ISDN alarm notification system comprising:
a plurality of digital switching equipment;
subscriber transmission equipment connected to the plurality of switching equipment; and
a controller for setting switch options externally, wherein the subscriber transmission equipment includes,
switching equipment interface units provided respectively for the plurality of digital switching equipment,
a control path unit, and
an ISDN subscriber interface unit, and
wherein the controller sets switch option for the switching equipment interface units, the control path unit and the ISDN subscriber interface unit, so that the set switch options are the same as corresponding to the plurality of digital switching equipment connected to the subscriber transmission equipment.

2. The ISDN alarm notification system according to claim 1, wherein the switch options in the ISON subscriber interface unit are provided for alarm controllers corresponding to the plurality of digital switching equipment.

3. The ISDN alarm notification system according to claim 1, wherein the plurality of digital switching equipment provide interfaces conforming to RDT301-1 to -4 standards, and each switching equipment type corresponding to each RDT303 standard can be set into the switching equipment interface unit, control path unit, and ISDN subscriber interface unit in the subscriber transmission equipment.

4. The ISDN alarm notification system according to claim 1, wherein the plurality of digital switching equipment are products of different venders.

5. The ISDN alarm notification system according to claim 1, wherein the ISDN subscriber interface unit includes alarm controllers of identical configuration corresponding to a plurality of channels to he connectable to a plurality of different switching equipment modes on a channel by channel basis.

6. The ISDN alarm notification system according to claim 5, wherein the ISDN subscriber interface unit includes alarm controllers for at least two channels in one ISDN card.

7. The ISDN alarm notification system according to claim 1, wherein the ISDN subscriber interface unit includes a terminator, which detects an uninstalled condition of an ISDN channel card.

8. The ISDN alarm notification system according to claim 1, wherein the ISDN subscriber interface unit includes a terminator, which detects a disconnected condition of a network terminal.

9. The ISDN alarm notification system according to claim 1, wherein the ISDN subscriber interface unit includes a terminator, which detects a power off condition of a network terminal.

10. An ISDN alarm notification system comprising:

a plurality of digital switching equipment;

analog switching equipment;

subscriber transmission equipment directly connected to the analog switching equipment, and to the plurality of digital switching equipment through digitizing equipment; and a controller for setting switch options externally, wherein the subscriber transmission equipment includes, switching equipment interface units provided respectively for the plurality of digital switching equipment, a control path unit, and an ISDN subscriber interface unit, and wherein the controller sets switch options for the switching equipment interface units, the control pat unit and the ISDN subscriber interface unit, so that the set switch options are the same as corresponding to the plurality of digital switching equipment connected to the subscriber transmission equipment.

* * * * *